United States Patent [19]

Alexander

[11] Patent Number: 5,026,416
[45] Date of Patent: Jun. 25, 1991

[54] LIQUID CROP STIMULANT

[75] Inventor: William Alexander, Naperville, Ill.

[73] Assignee: American Colloid Company, Arlington Heights, Ill.

[21] Appl. No.: 23,614

[22] Filed: Mar. 9, 1987

[51] Int. Cl.$^5$ .............................................. C05F 11/02
[52] U.S. Cl. .................................... 71/24; 71/DIG. 2
[58] Field of Search .............................. 71/24, DIG. 2

[56] References Cited

U.S. PATENT DOCUMENTS

| 4,440,560 | 4/1984 | Nakamura et al. | 71/24 |
| 4,588,431 | 5/1986 | Nakamura et al. | 71/24 |
| 4,698,090 | 10/1987 | Marihart . | |

OTHER PUBLICATIONS

CA 103(11):87079z, Rubinchik et al., 1985, "Production of Active. . . Phosphates", zh. Prikl. Khim 58(4), 724–729.

Primary Examiner—Ferris H. Lander
Attorney, Agent, or Firm—Marshall, O'Toole, Gerstein, Murray & Bicknell

[57] ABSTRACT

A method of improving agricultural and horticultural crop yields utilizing a mixture comprising a water-soluble salt of humic acid and either calcium phosphate or ascorbic acid. The addition of a liquid mixture comprising calcium phosphate or ascorbic acid and a water-soluble salt or humic acid to the growth medium or seed germination medium or agricultural or horticultural crops has demonstrated improved crop yields both in the size of the individual fruit and in the number of the fruit per plant.

34 Claims, 3 Drawing Sheets

THEORETICAL STRUCTURE OF HUMIC ACID

THEORETICAL STRUCTURE OF HUMIC ACID

OXIDATION SITES AVAILABLE FOR ADSORPTION OF MICRONUTRIENTS

EXCHANGE PREFERENCE FOR HUMIC ACIDS. SATURATED WITH POTASSIUM $Fe^{+++} > Al^{+++} > H^+ > Cu^{++} > Ni^{++} > Co^{++} > Zn^{++} > Fe^{++} > Ca^{++} > Na^+ > Mg^{++} > K^+ > NH_4^+ > Li^+$

LIQUID CROP STIMULANT

FIELD OF THE INVENTION

The present invention relates to a method of improving the yield of various agricultural and horticultural crops. More particularly, the present invention relates to a method of improving the yield of agricultural and horticultural crops by utilizing a liquid comprising a water-soluble salt of humic acid and either calcium phosphate or ascorbic acid. The water-soluble salt of humic acid, particularly the potassium salt of humic acid, when applied with calcium phosphate or ascorbic acid, has demonstrated an unexpected ability to increase crop yields, both in regard to the number of fruit per plant and in regard to the size of the individual fruit. Surprisingly, the combination of a water-soluble humic acid salt and either calcium phosphate or ascorbic acid showed a synergistic increase in crop yields compared to crop yields obtained using the humic acid salt, calcium phosphate or ascorbic acid alone, and compared to crop yields obtained using a mixture including the water-soluble humic acid salt, calcium phosphate and ascorbic acid.

BACKGROUND OF THE INVENTION

Soil humus, consisting of organic residues from the decomposition of plant matter, is known as an important soil constituent for enhancing the growth of plants. The formation of soil humus depends upon an adequate supply of raw organic residues and upon suitable conditions for their decomposition. Should either condition be lacking, the eventual decrease in soil humus content leads to reduced soil fertility. In these cases, the addition of organic matter is necessary to increase the fertility of the soil.

Humic acid, defined as the portion of soil humus that is soluble in alkaline solution, but insoluble in acid solution, is the form of organic matter that often is added to the soil to increase fertility. Humic acid is found in rotting vegetable matter and can be detected in the black slime of an ordinary compost pit in a home garden. It also is found in the brown organic matter of a variety of soils, as well as in peats, manure, lignite, leonardite and brown coals. Humic acid does not have a single unique structure, but is a mixture of intermediate chemical products resulting from the decomposition and conversion of lignin and other plant materials to hard coal. Humic acid apparently is formed by the bacterial and chemical degradation of plant tissue, but in soils it also may be formed by certain secondary processes such as polymerization of polyphenols leached by rain from surface leaf litter, and condensation of phenols, quinones, and proteins that are provided by the action of soil micro-organisms and small animals on soil carbohydrates. As a result, humic acid is best characterized in terms of its origin and soil environment, rather than in rigid terms of chemical composition or chemical properties.

Humic acid has been used either as a soil amendment or as a fertilizer component to increase the fertility of soils. For instance, in U.S. Pat. Nos. 3,111,404, 3,264,084 and 3,544,295, Karcher discloses a complex and expensive method of producing a dry ammonium humate fertilizer by treating a humic acid-bearing ore, such as leonardite, first with phosphoric acid, then with ammonia, in order to extract the humic acid content. Burdick, in U.S. Pat. No. 2,992,093, teaches a similar extraction process yielding dry humates useful as soil conditioners and fertilizers. Particulate ammonium humate fertilizers are disclosed by Cooley in U.S. Pat. No. 3,418,100.

Another method of extracting humic acid from a humic acid-bearing ore is disclosed in U.S. Pat. No. 3,770,411 to Chambers, whereby a liquid humate product is obtained by reacting the ore with ammonia, then with phosphoric acid and, if desired, micronutrient elements. Schwartz et al in U.S. Pat. No. 3,398,186 discloses using either an aqueous sulfate salt or a caustic soda solution as the extracting solution, followed by acidification to yield humic acid. In U.S. Pat. No. 3,076,291, Gardner teaches using ammonium, potassium, or sodium hydroxide to produce a humic acid-based seed germination promoter. Firth, in U.S. Pat. Nos. 4,274,860 and 4,321,076, discloses utilizing a humate derived from rutile sand deposits to stimulate growth in foliage plants. U.S. Pat. No. 4,319,041 to Goff discloses a method of forming a liquid humic acid product by mixing a humic acid-bearing ore, such as leonardite, with water and caustic soda.

The methods and compositions disclosed in the prior art are generally difficult and/or impractical to prepare and use. The disclosed methods are complex, involve large and expensive machinery, and usually produce granular materials. The prior art methods for producing the granular humates further suffer in that a substantial amount of the micronutrient elements essential to plant growth are extracted and removed during processing of the humic acid-bearing ore to a granular humic acid product. Methods of producing granular humates are also expensive, time-consuming, and require extra machinery to dry the humic acid product before packaging and use.

Therefore, it is highly desirable to provide a liquid humate product and thereby take advantage of easier storage, shipment, use and handling of a liquid product, of avoiding the extra step and cost of drying the product, and of direct application of the humate product by systems such as irrigation and spraying systems. However, the prior art methods of making liquid humates possess the serious disadvantages of low solids content and the presence of inactive and insoluble constituents. Consequently, several of the commercially available liquid humate products are only partially comprised of active humic acid solids, with the remainder of the advertised solids being inactive water-soluble constituents or inactive water-insoluble constituents that often plug irrigation and spray equipment.

Accordingly, it would be advantageous to provide a method of producing a highly concentrated aqueous solution of humates, such that insoluble constituents are minimized or eliminated and such that the solids content of the liquid is predominantly comprised of active humic acid salts as opposed to inactive soluble constituents. It also would be extremely advantageous to incorporate other additives into the liquid humate product to dramatically increase the effects of the humate upon agricultural and horticultural crops. As a result, the amount of humate-containing product applied to the crop could be reduced in order to obtain the same crop yield, or the unreduced amount of humate-containing product could be applied to obtain superior crop yields.

Any method utilizing a liquid humate in combination with additives acting synergistically to increase the effect of the humate would enhance and broaden the use of liquid humates in the agricultural and horticultural areas. Preferably any such method should utilize an economical, easy-to-manufacture liquid humate product possessing qualities that positively affect crop yield, such as number of fruit per plant and size per individual fruit.

BRIEF DESCRIPTION OF THE DRAWINGS

The invention both as to its organization and method of operation, together with further objects and advantages thereof, will best be understood by reference to the following specification taken in connection with the accompanying figure, in which.

SUMMARY OF THE INVENTION

Figure 1:
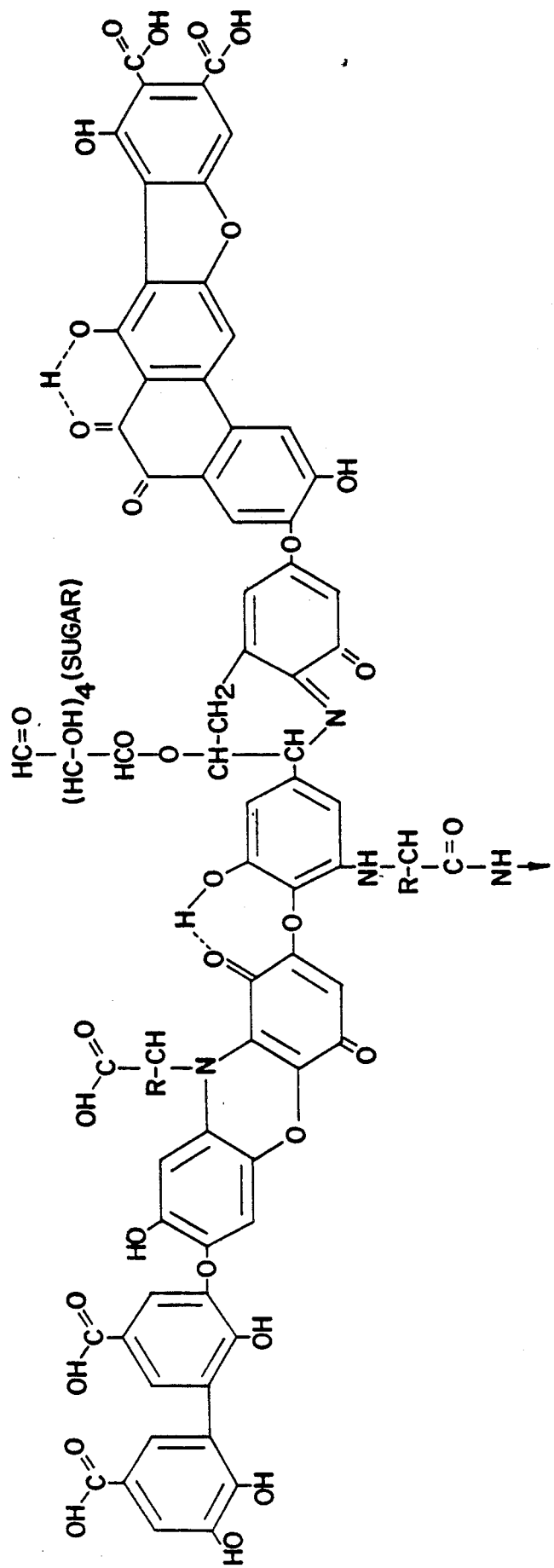
FIG. 1 is a proposed structure of humic acid.

In brief, the present invention is directed to a method of improving the yield of agricultural and horticultural crops by utilizing a mixture comprising a water-soluble salt of humic acid and either calcium phosphate or ascorbic acid. Surprisingly, it has been found that both the number of fruit per plant and the size per individual fruit are unexpectedly increased by applying a synergistic amount of either calcium phosphate or ascorbic acid together with a water-soluble humate salt to the growth medium or seed germination medium of the crop.

In accordance with the method of the present invention, a water-soluble humate salt, formed from a humate-bearing ore, in combination with a synergistic amount of calcium phosphate or ascorbic acid, can improve the crop yield of agricultural and horticultural crops. In regards to economics, ease of manufacture, ease of application and degree of improvement in crop yields, the method of the present invention is especially effective when the water-soluble humate salt and either calcium phosphate or ascorbic acid mixture is applied to the crop simultaneously in the liquid form.

Therefore, the present invention is directed to a method of improving the crop yields of agricultural and horticultural crops with a liquid, water-soluble humate salt in combination with a synergistic amount of calcium phosphate or ascorbic acid. A liquid mixture, comprising a water-soluble humate salt and either calcium phosphate or ascorbic acid, applied to the growth medium or seed germination medium of the crop, surprisingly and unexpectedly exhibits increased crop yields for agricultural and horticultural plants compared to using a solution of the water-soluble humate salt alone, the ascorbic acid alone or the calcium phosphate alone. Further, it is even more surprising that utilizing a solution of humate salt in combination with both calcium phosphate and ascorbic acid did not produce the increased crop yields observed by using a solution of humate salt in combination with calcium phosphate or ascorbic acid.

More particularly, the present invention is directed to a method of improving the crop yields of agricultural and horticultural crops utilizing about a 10% by weight to about 15%, e.g. about 11% to about 13% by weight and preferably about 12%, by weight aqueous solution of a humic acid salt that further includes from about 0.05% to about 2.0% by weight calcium phosphate or from about 0.05% to about 2.0% by weight ascorbic acid, e.g. about 0.5% to about 2% by weight of about 0.75% to about 1.5% by weight and preferably from about 0.15% to about 1.0% by weight of calcium phosphate or ascorbic acid. Generally, the ratio of ascorbic acid or calcium phosphate to water-soluble humic acid salt ranges from about 1:300 to about 1:5, and preferably from about 1:100 to about 1:10. Compared to humate salt solutions used alone, or humate salt solutions incorporating ascorbic acid and calcium phosphate, the composition utilized in the method of the present invention has demonstrated a superior ability to increase the yield of agricultural and horticultural crops. The humic acid salt solution, further including calcium phosphate or ascorbic acid, is generally applied to the crop as a 1% by volume aqueous solution containing, for example, about 50 ppm to about 1000 ppm, e.g. about 100 ppm to about 800 ppm calcium phosphate or ascorbic acid of the humic acid salt solution. The aqueous solution is applied at a dosage rate such that the amount of humic acid salt, calculated on a dry weight basis, does not exceed 10 lbs. of dry humic acid per acre. Exceeding this dosage rate may adversely affect the crop.

Without being limited to any particular theory or mechanism, it is suggested that the improved crop yield results are partially due to the method of manufacturing the humic acid salt. This particular method of manufacturing an aqueous solution of a humic acid salt provides a high percentage of active humate of about 15% by weight, without the formation of an appreciable amount of inactive water-soluble solids or inactive water-insoluble material, at a pH sufficient to attain maximum solubility and stabilization of the hydrocolloidal humic acid salts. The subsequent incorporation of a synergistic amount of calcium phosphate or ascorbic acid into the aqueous humic acid salt solution further increases the agricultural and horticultural crop yields, both in regard to number of fruit per tree and in regard to size of individual fruit, compared to crop yield increases observed using a solution of the liquid humate salt alone.

Therefore, it is an object of the present invention to provide a method of increasing the yield of agricultural and horticultural crops. It is also an object of the present invention to provide a method of increasing the crop yield of agricultural and horticultural crops by utilizing a water-soluble salt of humic acid.

Another object of the present invention is to provide a method of increasing the yield of agricultural and horticultural crops by utilizing a water-soluble humic acid salt manufactured according to a method whereby the humic acid salt is available as a concentrated solution of a humic acid salt containing essentially no inert insoluble or inert soluble material.

Another object of the present invention is to provide a method of increasing the yield of agricultural and horticultural crops by utilizing a concentrated aqueous solution comprising a humic acid salt and a synergistic amount of either calcium phosphate or ascorbic acid.

Another object of the present invention is to provide a concentrated solution, comprising a humic acid salt and a synergistic amount of either calcium phosphate or ascorbic acid, of sufficiently high pH to maximize humic acid salt solubility and stability.

Another object of the present invention is to provide a liquid crop stimulant to increase the yield of agricultural and horticultural crops both in regard to the number of fruit per plant and in regard to the size of each individual fruit.

Another object of the present invention is to provide a liquid crop stimulant manufactured from readily available ores, containing a large percentage of active humic acid, by an easy and economical process to yield a concentrated, aqueous humic acid salt solution.

Another object of the present invention is to provide a method for increasing the crop yield of agricultural and horticultural crops whereby an aqueous solution of a salt of humic acid, including a synergistic amount of either calcium phosphate or ascorbic acid, can be applied at relatively low application rates to afford improved results in root growth, color, growth rate, and seed germination in a relatively short period of time.

These and other objects and advantages of the present invention will become apparent from the following detailed description of the invention.

DETAILED DESCRIPTION OF THE INVENTION

Soil humus, because of its humic acid content, is an important soil constituent for enhancing the growth of plants. Humic acid promotes crop production by acting to bind sandy soils, loosening clayey soils, increasing the moisture-holding capacity of the soil, resisting the eroding action of wind, water and cultivation, storing and releasing macronutrient and micronutrient elements to the plants, and providing the conditions needed for optimal micro-organism growth. Overall, humic acid-containing humus offers the best medium for plant growth. Therefore, for soils deficient in humic acid, it is necessary to add various forms of organic matter to enhance the ability of the soil to act as a growth medium.

One of the most common organic adjuvants added to soil is humic acid itself. Although humic acid is derived from several sources, such as lignite, leonardite, peat and manure, the preferred source of humic acid is leonardite. Leonardite, usually found in ore deposits that overlay lignite coal deposits, is a highly oxidized form of lignite containing a higher oxygen content than lignite. The areas of greatest lignite coal oxidation lie along the outcrops at the surface of the leonardite overlay, and it is humic acid derived from these highly oxidized outcrops that are used most advantageously in the method of the present invention. These highly oxidized leonardite ores yield humic acid of a very high activity, making the ores an ideal raw material since the humic acid can be extracted with the best cost/benefit ratio.

Figure 2:
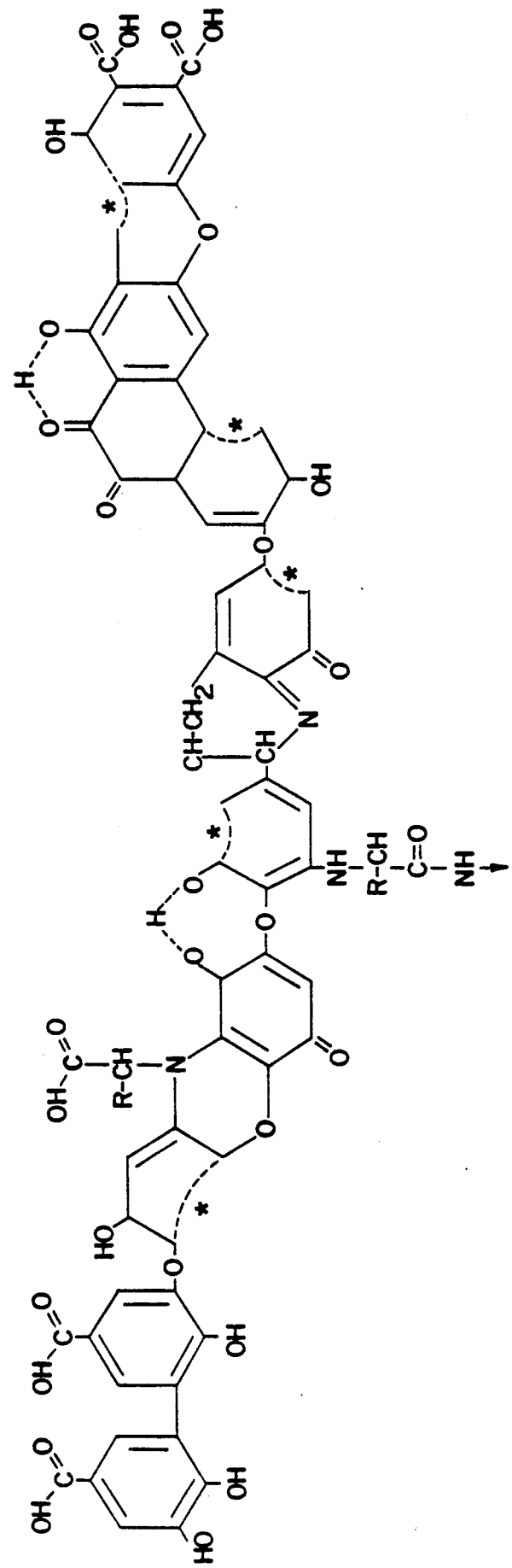
FIG. 2 is the chemical structure of humic acid showing the oxidation sites available for adsorption of micronutrients.

The North Dakota leonardite used to obtain the humic acid used in the method of the present invention is defined by the U.S. Bureau of Mines as "essentially salts of humic acids". The humic acid derived from this North Dakota leonardite differs from the theoretical formula of humic acid illustrated in FIG. 1 because part of the humic acid structure has been oxidized, leaving sites for cation absorption by the resultant negative charge. This oxidized structure is generally illustrated in FIG. 2, wherein the oxidized sites are depicted by asterisks.

Chemical studies of the composition of leonardite have revealed that it is mainly composed of the mixed salts of acid radicals found in soil humus, a product of the decay of organic matter that contains both humic and nonhumic material. Such acid radicals are collectively termed "humic acids," having individual fractions named humin, humic acid, ulmic acid and fulvic acid. The exact structure of the humic acids are unknown. However, humic acids appear to be associations of molecules forming aggregates of elongated bundles of fibers at low pH, and open flexible structures perforated by voids at high pH. These voids, of varying dimensions, trap organic or inorganic particles of appropriate electronic charge.

The humic acids have a large cation exchange capacity and hold multivalent elements, such as micronutrient elements, very strongly. The molecular weight of the humic acids range from 800 to 500,000, with the weight average molecular weight ranging from about 5,000 to about 50,000. The cation exchange capacity of the humic acids varies from about 200 to about 600 meq $CaCO_2$ per 100 grams at pH 7, depending upon the origin of the extracted acids. Humic acids are polyelectrolytes and are believed to form complexes with clay particles thus enabling humic acids to bind multivalent elements with great tenacity. When the cation exchange sites on the humic acid molecule are filled predominantly with hydrogen ions, the material, considered to be an acid, is insoluble in water. However, when the predominant cations at the exchange sites are other than hydrogen, the material is called a "humate". Humates of the monovalent alkali metals or ammonia are soluble in water, but the humates of most multivalent metals are insoluble.

Humic acids in the form of their ammonium salts are soluble in water and when mixed with soil, have been found to promote plant growth. Specifically, the ammonium humates increase root growth and root formation, deepen the color of leaves, flowers and fruit, increase branching at high application rates, and increase the volume of fruit obtained.

Such beneficial effects on plant growth make ammonium humates highly desirable. However, the ammonium salts of humic acid tend to lose ammonia via evaporation, leaving the insoluble humic acid behind. As a result, ammonium humate solutions do not possess the stability to make them viable as concentrated liquid growth-stimulating products. Therefore, in accordance with the method of the present invention, a non-volatile cation is used to neutralize the humic acid and to produce a stable, concentrated liquid growth stimulant, based on a water-soluble form of humic acid.

Leonardite in its natural state is composed predominantly of insoluble calcium, iron and aluminum humates. The calcium content of leonardite is high, and accordingly, treatment with materials that remove the calcium and form inorganic, insoluble calcium salts increases the water solubility of the humate. Although leonardite is an abundant source of humic acid, its utilization as a humic acid raw material has been limited due to the lack of a simple, efficient means of converting its humic acid content into soluble forms.

Previous attempts to extract the humic acid content of leonardite have involved inefficient and unsatisfactory processes. Usually the leonardite was made colloidal by ammoniation, however, with aging, the ammonia evaporated and the humic acid content again became insoluble. Additionally, the processing of the leonardite involved numerous steps, including separation of any insoluble material by a filtration process requiring the addition of large amounts of water, i.e., establishment of a slurry, thus necessitating the subsequent removal of relatively large volumes of water.

Figure 3:
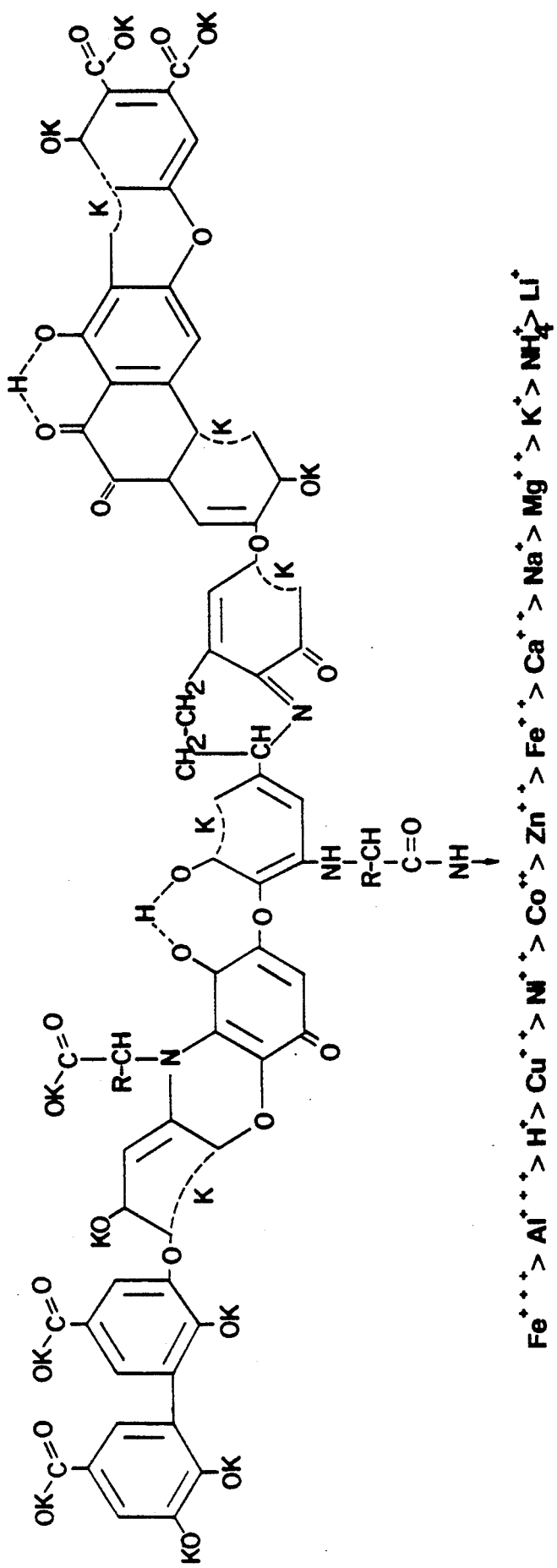
FIG. 3 if the chemical structure of oxidized humic acid saturated with potassium ions and a list of metal ions showing their exchange preference with humic acid.

According to the method of the present invention, the oxidized sites of humic acid are filled with non-volatile metal ions that maintain the water solubility of the humate salt. In particular, to produce a water-soluble salt of humic acid that is suitable to enhance plant growth, leonardite is treated with an alkali metal hydroxide, such as lithium hydroxide, potassium hydroxide or sodium hydroxide. To achieve the full advantage of the present invention, the humic-acid bearing leonardite ore is treated with potassium hydroxide. By this method the oxidized sites of the humic acid are saturated with readily ion-exchangeable, non-volatile alkali metal ions, such as potassium ions. In addition, using an alkali metal hydroxide to solubilize the humic acid allows the pH to be increased to the range of approximately 11, such that the maximum solubility of the humic acid salt is attained, and such that the humic acid hydrocolloids are stabilized in solution. The fully potassium-saturated humic acid structure, and the relative exchangeability of the cations found in the soil are illustrated in FIG. 3. The relative position of potassium shows that it will readily exchange with the micronutrient ions in the soil such as iron, aluminum, copper, nickel, cobalt, zinc and iron. By cation exchange of the potassium ion for the micronutrient element ions, the micronutrient elements then are available for uptake by the plant along with the humic acid. In addition, by exchanging the potassium ions for the micronutrients ions present in the soil, the released potassium ions of the humic acid provides the further benefit of introducing a major fertilizer ingredient into the soil.

The source of leonardite used to produce the water-soluble salt of humic acid of the present invention is important in that the leonardite should contain a high percentage of active humic acid. All humic acid-bearing ores contain inactive ingredients such as clay, shales, gypsum, silica and fossilized organic matter, however, it is desirable to minimize the amount of inactive materials present in the ore. It has been found that the percentage of inactive ingredients is lowest for ores mined from North Dakota leonardite deposit outcrops. For these humic acid-bearing ores, the contaminants account for only approximately 15% by weight of the humic acid-bearing ore. However, the remaining 85% by weight of the ore is not all recoverable humic acid. Some of the humic acid content is irreversibly combined with crystallized minerals, and some of the humic acid is polymerized into insoluble molecules, such as the heavier molecular weight analogs of humic acid, like ulmic acid and humin. Usually, approximately 50% dry weight of the humic acid-bearing ore can be converted into active humic acid. This is a relatively high percentage and is accomplished by adding an oxidizing agent, such as an aqueous solution of hydrogen peroxide, sodium perborate, or sodium peroxycarbonate in addition to an alkali hydroxide, to the humic acid-bearing ore to facilitate liberation of the humic acid from the contaminants found in the ore. The inactive portion of the humic acid-bearing ore, including the insoluble and/or inorganic constituents, is allowed to separate and is filtered from the active, water-soluble humic acid salt.

As previously stated, humic acid is a complex material and is comprised of several constituents having a wide range of molecular weights. Humic substances in general are defined according to their solubility and include fulvic acid, humic acid, hymatomelanic acid, ulmic acid and humin. For instance, fulvic acid is a fraction of soil organic matter, that, like humic acid, is soluble in dilute alkalis; but, unlike humic acid, is soluble in mineral acid. It is believed that fulvic acid has a simpler structure than humic acid and is a percursor of humic acid. In accordance with an important feature of the present invention, the water-soluble salt of humic acid obtained from the alkali metal hydroxide and oxidizing agent treatment of the humic acid-containing ore contains from about 3% to about 5% fulvic acid. It has been theorized that the shorter chain humic acid fractions and fulvic acid fractions can be absorbed by the plant wherein the acids are metabolized, and thereby release the bound micronutrient elements to the plant. These shorter-chained humic acid precursors therefore enhance the transport and transfer of plant nutrients and micronutrients from the soil to the plant. The medium chain length humic acid constituents are absorbed more slowly than the short chain humic acid and fulvic acid constituents; the long chain humate constituents, such as ulmic acid, essentially are not absorbed. The water-soluble humic acid salts obtained by the method of the present invention contain essentially none of these high molecular weight, insoluble humic acid constituents that do not promote plant growth.

In accordance with another important feature of the method of the present invention, the oxidizing agent, such as hydrogen peroxide, is included in the humic acid extraction process to act as a preservative to improve the shelf-life of the concentrated humic acid salt solution. It has been theorized that the oxidizing agent also acts both to help separate the humic acid from the non-humate contaminants in the ore and to increase the amount of short- and medium-chain humate constituents at the expense of long-chain humate constituents. As mined, leonardite ore contains long-chain, medium-chain, and short-chain humates. However, during the extraction process, the oxidizing agents may attack and rupture the naturally occurring long-chain humate polymers and partially convert the long-chain polymers into medium- and short-chain length humate polymers.

It has been found that about 15% is the maximum percent of high activity humic acid solids achievable in solution. As the percent solids content increases above approximately 15%, the solution is too heavily saturated and the humic acid salts begin to precipitate. Although some present day commercial liquid humic acid products claim to contain about 15% humic acid solids, these products are in reality mixtures of a small percentage of active humic acid salts, plus a greater percentage of inactive humic acid constituents and, ofentimes, insoluble particles. The inactive and insoluble constituents do not enhance plant growth, but possess the disadvantage of plugging irrigation and spray distribution equipment.

Humic acid products extracted from manure or peat generally are not as effective in absorbing micronutrient elements as the humic acid product made according to the method of the present invention. In addition, humic acid products derived from lignite will not provide substantial plant growth stimulation unless the humic acid has been partially oxidized, such that it resembles the humic acid derived from leonardite.

Obtaining humic acid by extracting a suitable humic acid-containing ore, such as leonardite, with an aqueous solution of sodium hydroxide is known. In the past, the humic acid content of the ore has been dissolved in the alkaline extracting solution, then separated from insoluble contaminants. The humic acid extract then is acidified and the humic acid precipitated from solution. By this method, the maximum amount of humic acid, as a salt, dissolved in the strongly caustic extracting solution was about eight percent by weight. In addition, this process required large quantities of sodium hydroxide and water to recover humic acid in commercial operations.

A humic acid-containing solution, suitable for use in the method of the present invention, is made according to the method of Example 1. This potassium humate salt exhibits excellent water solubility and is essentially free of inactive soluble materials or insoluble inorganic materials. The humic acid is solubilized with an alkali, adjusted to a high degree of alkalinity, and treated with an oxidizing agent. Then the humate salt is separated from insoluble and inert contaminants and used as a concentrated liquid growth stimulant. Additionally, this process does not require the addition of ammonia or the acidification of the extract.

EXAMPLE 1

Leonardite, such as the type mined from the outcrops of lignite reserves in North Dakota, is ground to a fine powder. Then approximately 1750 lbs. of the ground leonardite is thoroughly dispersed in solution comprising approximately 9800 lbs of water, 440 lb. of 90% potassium hydroxide and 5 gal. of 30% aqueous hydrogen peroxide. The mixture is heated to about 160° F. to about 200° F., e.g. 180° F. and agitated for 4 hours to effect extraction of the humic acid from the ore and conversion of the humic acid to a water-soluble humate salt. Periodic additions of potassium hydroxide may be made to maintain the pH between approximately 10 and 12, and preferably a pH of approximately 11, to assure effective extraction and solubilization of the humic acid. After the approximately 4 hrs. of agitation, the mixture is transferred to a holding tank. Any insoluble material is allowed to settle from the aqueous potassium humate salt solution over a 30 to 40 day period, and subsequently filtered from potassium humate solution, or alternatively, the insoluble material is removed by centrifuging the mixture followed by removal of the insoluble material by filtration. The potassium humate salt solution then is adjusted to a final pH of approximately 10 to approximately 12, e.g. about 10.5 to about 11.5, and preferably to a pH of approximately 11, by the addition of potassium hydroxide. The solution also is adjusted to a humic acid salt concentration of between approximately 10% and approximately 15% by weight, and preferably to a humic acid salt concentration of approximately 12% by weight, by the addition of water.

To illustrate the plant growth effects of the liquid humate produced according to the method of Example 1, celery seeds were germinated in soil treated with the liquid humate. The effects of humic acid-containing materials on seed germination are similar to those for a rooted plant and resemble the effects of indole butyric acid, a well-known agent for promoting and accelerating root formations of plant clippings by unknown mechanisms. It is theorized that humic acid-containing materials, carrying both micronutrient elements and water, move into the seed through the pore, and stimulate development of the seed. Seeds germinate faster in the presence of humic substances, but, more importantly, a higher percentage of seeds actually do germinate.

In this particular celery experiment, conducted in Florida, 70% of the seeds germinated in soil treated with a 1% by volume aqueous solution of the potassium humate salt solution made according to the method of Example 1 compared to a 52% seed germination rate in untreated soil. This approximately 35% increase in the amount of seed germination reduces seed cost and allows more efficient utilization of seed plots. The stimulation of seed germination by the potassium humate salt-containing solution can compensate for unexpectedly cool or rainy conditions thereby providing a wider margin of safety for the grower.

In accordance with an important feature of the present invention, a humate salt solution made according to the method of Example 1 can be mixed with calcium phosphate or ascorbic acid to improve the yield of agricultural and horticultural crops. Calcium is known to be an important element both in regard to plant nutrient requirements and in regard to improving soil texture. The addition of calcium phosphate to an aqueous humic acid salt solution makes the calcium more available to the plants because the calcium ion replaces potassium ions in the humate and is sequestered by the humic acid salt. The calcium ion therefore is transported into the plant with the humate salt for more efficient plant use in comparison to the highly water-insoluble and non-transportable calcium phosphate. The exchanging of potassium ions of the humate salt for a calcium ion both releases the calcium ion for more efficient plant use and also frees the phosphate portion of the insoluble calcium phosphate to the soil, allowing the plant to help fulfill its phosphate needs. In addition, according to the method of the present invention, the amount of calcium phosphate added to the water-soluble humate is not great enough to materially affect the water-solubility of the humate salt.

Ascorbic acid also is known as an additive to enhance plant growth and as an additive to extend the life of freshly cut flowers. Although the positive benefits of humic acid, calcium phosphate and ascorbic acid upon plant growth are known, a mixture comprising a solution of a humic acid salt with either calcium phosphate or ascorbic acid affords increased agricultural and horticultural crop yields that are both surprising and unexpected.

To demonstrate the new and unexpected results of the present invention, carrot seeds were pregerminated in the presence of a humic acid salt, as a water-soluble humate salt made according to the method of Example 1, and calcium phosphate in aerated columns of water for 4 days to determine the affect of these additives upon eventual crop yield. As illustrated in Table I, the carrot seeds of Example 2 were pregerminated in plain tap water, whereas the seeds in Example 3 were pregerminated in a 1% by volume aqueous solution of the water-soluble humate salt made according to the method of Example 1, the seeds in Example 4 were pregerminated in the presence of 160 PPM calcium phosphate and the seeds of Example 5 were pregerminated in a 1% by volume solution of the water-soluble humate sald made according to the method of Example 1 and 160 PPM calcium phosphate. After germination, the carrot seeds were planted in flats.

TABLE I

EFFECT OF HUMIC ACID AND CALCIUM PHOSPHATE UPON PREGERMINATION AND YIELD OF CARROTS

| EXAMPLE | TREATMENT | CONCENTRATION | ROOT NUMBERS | ROOT WT (KG) |
|---|---|---|---|---|
| 2 | RAW SEED | | 82.5 | 4.6 |
| 3 | HUMIC ACID | 1% by volume of a 12% by weight humic acid salt solution | 93 | 6.3 |
| 4 | CALCIUM PHOSPHATE | 160 PPM | 81.5 | 4.5 |
| 5 | HUMIC ACID | 1% by volume of a 12% by weight humic acid salt solution | 100 | 8.5 |
| | PLUS CALCIUM PHOSPHATE | 160 PPM | | |

The addition of calcium phosphate to the aerated columns of water (Example 4), decreases root numbers by about 1% and root weight by about 2% in comparison to Example 2, wherein no additives are included in the aerated columns of water. In comparison, the addition of a humic acid salt solution to the water (Example 3) shows about a 13% increase in carrot root numbers and about a 37% increase in root weight over the untreated Example 2. However, in accordance with the present invention, the addition of both a humic acid salt solution and calcium phosphate to the pregermination water (Example 5) increases root numbers about 21% and root weight about 85% over the untreated Example 2. Such synergistic results are totally unexpected considering the modest increase in root numbers and root weight observed in Example 3, using humic acid salt solution alone, and the actual decrease in root numbers and root weight observed in Example 4, using calcium phosphate alone.

Similarly, Table II illustrates the positive synergistic effect upon the yield of peppers by adding ascorbic acid and a humic acid salt solution to a pepper seed germination medium. The addition of ascorbic acid alone to the pregermination medium (Example 7) results in a decrease in the weight of the individual peppers, and modest increases in total number of peppers and in numbers of peppers per plant compared to untreated control Example 6. Example 8, illustrating the addition of only a humic acid salt solution to the pregermination medium exhibits substantial increases in weight per pepper of approximately 67%, in total number of peppers of approximately 62%, and in number of peppers per plant of approximately 19% in comparison to untreated Example 6. However, the addition of a humic acid salt solution product and ascorbic acid to the seed germination medium shows surprising and unexpected increases of about 112% in weight per pepper, of about 84% in number of peppers, and of about 42% in number of peppers per plant in comparison to untreated Example 6.

TABLE II

EFFECT OF HUMIC ACID AND ASCORBIC ACID UPON YIELDS OF PEPPERS

| EXAMPLE | TREATMENT | CONCENTRATION | WEIGHT/FRUIT | # FRUIT | # FRUIT PLANT |
|---|---|---|---|---|---|
| 6 | UNTREATED | | 1.06 | 30.8 | 29.65 |
| 7 | ASCORBIC ACID | 660 PPM | 0.96 | 32.4 | 30.22 |
| 8 | HUMIC ACID | 1% by volume of a 12% by wt. humic acid salt solution | 1.77 | 49.8 | 35.19 |
| 9 | HUMIC ACID | 1% by volume of a 12% by wt. humic acid salt solution; | 2.25 | 56.8 | 42.10 |
| | ASCORBIC ACID | 660 PPM | | | |

Comparative tests performed on tomatoes are illustrated in Examples 10-13 of Table III. In these trials, the ascorbic acid and/or humic acid salt solution were incorporated into a fluid drilling gel and applied to the roots of transplanted tomato plants. In regard to tomatoes, both ascorbic acid and the humic acid salt solution, when used alone, increased both the number and weight of red and green tomatoes (Example 11 and 12). However, the addition of a humic acid salt solution and ascorbic acid to the growth medium (Example 13) unexpectedly provided further yield increases.

TABLE III

EFFECT OF HUMIC ACID AND ASCORBIC ACID UPON YIELDS OF TOMATOES

| EXAMPLE | TREATMENT | CONCENTRATION | # RED | WT RED | # GREEN | WT GREEN |
|---|---|---|---|---|---|---|
| 10 | UNTREATED | | 71.4 | 10.14 | 150 | 15.86 |
| 11 | ASCORBIC ACID | 160 PPM | 92.2 | 13.13 | 190.8 | 18.70 |
| 12 | HUMIC ACID | 1% by volume of a 12% by wt. humic acid salt solution | 106.2 | 15.70 | 208.6 | 20.91 |
| 13 | HUMIC ACID; ASCORBIC ACID | 1% by volume of a 12% by wt. humic acid salt solution; 160 PPM | 110.2 | 16.30 | 237 | 24.24 |

Examples 14-17 in Table IV illustrate the effects of adding a humic acid salt solution and/or ascorbic acid to the seed germination liquor of sweet corn. In each of the Examples 14-17 germination was initiated for 24 hrs. in an untreated aerated water system maintained at 25° C. The germination water was changed after 1 hr., 4 hrs. and 8 hrs. after the beginning of the germination treatment. The seeds then were placed in the appropriate humic acid salt and/or ascorbic acid treatment for 24 hrs. at 27° C. Examples 14-16 show that sweet corn yields are not materially improved by germinating the sweet corn seeds in water containing only ascorbic acid or a humic acid salt.

However, in Example 17, utilizing a humic acid salt solution and ascorbic acid, demonstrated an approximately 9% increase in the total number of ears of corn and an approximately 17% increase in the total weight of the ears of corn in comparison to Examples 14 through 16.

yields, however, a mixture of the humic acid salt solution, ascorbic acid, and calcium in phosphate did not provide the unexpected increases in crop yield observed in humic acid salt-calcium phosphate and humic acid salt-ascorbic acid mixtures. For example, adding a solution containing 1% by volume of a 12% by weight humic acid solution, 30 ppm ascorbic acid and 160 ppm calcium phosphate to the seed germination medium of sweet corn produced only 16.0 ears of corn, having a total weight of 3.47. Therefore, adding a solution containing humic acid, ascorbic acid and calcium phosphate demonstrated an approximately 5% decrease in total number of fruit and a 1% decrease in total weight of fruit compared to Example 14, an untreated sample. Likewise, the solution containing each of three ingredients showed an approximately 13% decrease in total number of fruit and an approximately 21% decrease in total weight of the fruit compared to Example 17, that utilized only a humic acid salt solution and ascorbic acid.

TABLE IV

EFFECT OF HUMIC ACID AND ASCORBIC ACID UPON YIELD OF SWEET CORN

| EXAMPLE | TREATMENT | CONCENTRATION | # EARS | TOTAL WT OF EARS |
|---|---|---|---|---|
| 14 | UNTREATED | | 16.8 | 3.50 |
| 15 | ASCORBIC ACID | 330 PPM | 16.6 | 3.21 |
| 16 | HUMIC ACID | 1% by volume of a 12% by wt. humic acid salt solution | 16.6 | 3.57 |
| 17 | HUMIC ACID plus ASCORBIC ACID | 1% by volume of a 12% by wt. humic acid salt solution; 330 PPM | 18.4 | 4.20 |

Therefore, in accordance with an important feature of the method of the present invention, a concentrated liquid humic acid salt-containing product can be combined with calcium phosphate or ascorbic acid to substantially increase the yield of agricultural and horticultural crops. Surprisingly, it has been found that the humic acid salt solution acts synergistically with the ascorbic acid or the calcium phosphate to increase crop It is to be understood that the method of the present invention is intended to supplement, and not necessarily replace, the basic fertilizer needs of the various agricultural and horticultural crops. The liquid humic acid salt product, made according to the method of the present invention, is not a fertilizer, but a complement to fertilizer. Fertilizer acts as the primary nutrient source for both plants and microflora, and the humic acid salt acts as a transport mechanism for moving the fertilizer and micronutrient elements from the soil to the plant. Therefore, whenever possible, the humic acid salt product, made according to the method of the present invention, should be used in conjunction with fertilizer. It is well-documented that humic acid and humate salt has the ability to absorb fertilizer components and regulate fertilizer release to plants, ultimately making the fertilizer more effective. As a result, judicious use of the highly-active liquid humic acid salt products made according to the method of the present invention, in conjunction with fertilizers, will improve plant growth performance in marginally fertile soils or soils with low native organic manner and will improve yields of crops grown in arid regions of the world.

The liquid humic acid salt containing product, made by the method of the present invention, plus the addition of calcium phosphate or ascorbic acid, serves to assist the plant and the soil to more fully utilize the fertilizer and the naturally-occurring nutrients for improved plant growth and crop yields. The low percentages of humic acid and ascorbic acid or calcium phosphate necessary to improve crop yields according to the method of the present invention, make the method easy and economical to implement, while making better use of agricultural resources through improved seed germination, nutrient use and crop yields.

The method of the present invention may be used on any seeds, and is not limited to a specific species. The method may be used to increase the crop yields of food crops such as soybeans, peas, potatoes, eggplant, cucumbers, melons, squash, cabbage, cauliflower, small grains, sweet potatoes, peanuts, strawberries and citrus, in addition to the agricultural crops illustrated in the Examples. The method of the present invention also may be used on non-food crops, such as tobacco, ornamentals, turf and for grass seeding cuts along highways.

It should be understood that the present disclosure has been made only by way of preferred embodiment and that numerous changes in details of construction, combination and arrangement of parts may be resorted to without departing from the spirit and scope of the invention as hereinunder claimed.

What is claimed and sought to be secured by Letters Patent of the United States is:

1. A crop stimulating composition consisting essentially of water-soluble alkali metal salt of humic acid obtained from the alkali metal hydroxide treatment of an oxidized humic acid containing ore; about 0.05% to about 2.0% by weight ascorbic acid; and water.

2. The composition of claim 1, wherein the water-soluble salt of humic acid is present in an amount of about 10% by weight to about 15% by weight of the composition, and is the lithium, sodium or potassium salt of humic acid, or mixtures thereof.

3. The composition of claim 2, wherein the water-soluble salt of humic acid is the potassium salt of humic acid and the composition has a pH of approximately 10 to approximately 12.

4. The composition of claim 2, wherein the water-soluble salt of humic acid is present in an amount of about 11% by weight to about 13% by weight of the composition.

5. The composition of claim 1, wherein the calcium phosphate or ascorbic acid is present in an amount of about 0.15% by weight to about 1.0% by weight of the composition.

6. A liquid crop stimulant consisting essentially from about 10% by weight to about 15% by weight of an alkali metal salt of humic acid; from about 0.05% by weight to about 2.0% by weight of ascorbic acid; and water, wherein the method of making the alkali metal salt of humic acid comprises adding a crushed humic acid-containing ore to a mixture comprising an alkali metal hydroxide, an oxidizing agent and water; heating the aqueous mixture to a temperature of about 160° F. to about 200° F.; agitating the mixture for a time sufficient to obtain a solution of a watersoluble salt of humic acid; adding a sufficient amount of an alkali metal hydroxide to maintain the mixture at a pH from about 10 to about 12; separating insoluble materials from the alkali metal salt of humic acid; and adding water to adjust the amount of alkali metal salt of humic acid in the solution to about 10% by weight to about 15% by weight.

7. The composition of claim 6, wherein the humic acid-containing ore is leonardite.

8. The composition of claim 6, wherein the alkali metal hydroxide is lithium hydroxide, sodium hydroxide, potassium hydroxide or mixtures thereof.

9. The composition of claim 8, wherein the alkali metal hydroxide is potassium hydroxide.

10. The composition of claim 6, wherein the oxidizing agent is hydrogen peroxide, sodium perborate, sodium peroxycarbonate or mixtures thereof.

11. The composition of claim 10, wherein the oxidizing agent is hydrogen peroxide.

12. The composition of claim 6, wherein the alkali metal salt of humic acid is present from about 11% by weight to about 13% by weight.

13. A method of manufacturing a liquid crop stimulant comprising agitating and heating a mixture consisting essentially of a humic acid-bearing ore, an alkali metal hydroxide, and water; maintaining the mixture at a pH of about 10 to about 12 by adding a sufficient amount of the alkali metal hydroxide; agitating the mixture for a time sufficient to obtain a solution of a water-soluble salt of humic acid; separating at least a portion of the solution of the water-soluble humic acid salt from insoluble materials in the mixture; adding water to the solution of the water-soluble humic acid salt to adjust the amount of the water-soluble salt in the solution from about 10% by weight to about 15% by weight; adding about 0.05% to about 2.0% by weight ascorbic acid to the solution of the water-soluble humic acid salt; and agitating until the mixture is substantially homogeneous.

14. The method of claim 13, wherein the humic acid-containing ore is leonardite.

15. The method of claim 13, wherein the alkali metal hydroxide is lithium hydroxide, sodium hydroxide, potassium hydroxide or mixtures thereof.

16. The method of claim 15, wherein the alkali metal hydroxide is potassium hydroxide.

17. The method of claim 13, including adding an oxidizing agent selected from the group consisting of hydrogen peroxide, sodium perborate, sodium peroxycarbonate and mixtures thereof.

18. The method of claim 17, wherein the oxidizing agent is hydrogen peroxide.

19. The method of claim 13, wherein the pH of the mixture is maintained in the range of about 10.5 to about 11.5.

20. The method of claim 13, wherein water is added to the water-soluble salt of humic acid solution to adjust the amount of water-soluble salt of humic acid to about 11% by weight to about 13% by weight of the solution.

21. A method of improving the crop yield of agricultural and horticultural crops comprising adding a liquid crop stimulant consisting essentially of a water-soluble alkali metal salt of humic acid obtained from the alkali metal hydroxide treatment of an oxidized humic acid containing ore and about 0.05% to about 2.0% by weight ascorbic acid to the seed germination medium or growth medium of the crop.

22. The method of claim 21, wherein the liquid crop stimulant from about 10% by weight to about 15% by weight of the water-soluble salt of humic acid and from about 0.05% to about 2.0% by weight of ascorbic acid.

23. The method of claim 22, wherein the water-soluble salt of humic acid is the potassium salt of humic acid.

24. The method of claim 21 wherein the ascorbic acid is present in the seed germination medium or growth medium in the range of about 0.5% by volume to about 2% by volume of the liquid crop stimulant.

25. The method of claim 24 wherein the water-soluble salt of humic acid is present in the seed germination medium or growth medium in the range of about 0.75% by volume to about 1.5% by volume of a 12% by weight water soluble salt of a humic acid solution.

26. The method of claim 21, wherein the ascorbic acid is present in the seed germination medium or growth medium in the range of about 50 ppm to about 1000 ppm of the medium.

27. The method of claim 26, wherein the ascorbic acid is present in the seed germination medium or growth medium in the range of about 100 ppm to about 800 ppm of the medium.

28. A liquid crop stimulant consisting essentially of from about 10% by weight to about 15% by weight of an alkali metal salt of humic acid; from about 0.05% by weight to about 2.0% by weight of calcium phosphate or ascorbic acid; and water, wherein the method of making the alkali metal salt or humic acid consists essentially of adding a crushed humic acid-containing ore to a mixture comprising an alkali metal hydroxide, an oxidizing agent and water; heating the aqueous mixture to a temperature of about 160° F. to about 200° F.; agitating the mixture for a time sufficient to obtain a solution of a water-soluble salt of humic acid; adding a sufficient amount of an alkali metal hydroxide to maintain the mixture at a pH from about 10 to about 12; separating insoluble materials from the alkali metal salt of humic acid; and adding water to adjust the amount of alkali metal salt of humic acid in the solution to about 10% by weight to about 15% by weight.

29. The composition of claim 28, wherein the humic acid-containing ore is leonardite.

30. The composition of claim 28, wherein the alkali metal hydroxide is lithium hydroxide, sodium hydroxide, potassium hydroxide or mixtures thereof.

31. The composition of claim 30, wherein the alkali metal hydroxide is potassium hydroxide.

32. The composition of claim 28, wherein the oxidizing agent is hydrogen peroxide, sodium perborate, sodium peroxycarbonate or mixtures thereof.

33. The composition of claim 32, wherein the oxidizing agent is hydrogen peroxide.

34. The composition of claim 28, wherein the alkali metal salt of humic acid is present from about 11% by weight to about 13% by weight.

* * * * *